(12) United States Patent
Lewerenz (10) Patent No.: US 9,751,464 B2
(45) Date of Patent: Sep. 5, 2017

(54) TRAFFIC WARNING INDICATOR SYSTEM

(71) Applicant: Ronald A. Lewerenz, Los Gatos, CA (US)

(72) Inventor: Ronald A. Lewerenz, Los Gatos, CA (US)

(*) Notice: Subject to any disclaimer, the term of this patent is extended or adjusted under 35 U.S.C. 154(b) by 0 days.

(21) Appl. No.: 14/692,572

(22) Filed: Apr. 21, 2015

(65) Prior Publication Data

US 2016/0311371 A1    Oct. 27, 2016

(51) Int. Cl.
| | |
|---|---|
| *G08G 1/07* | (2006.01) |
| *G08G 1/095* | (2006.01) |
| *G08G 1/08* | (2006.01) |
| *G08G 1/097* | (2006.01) |
| *G08G 1/123* | (2006.01) |
| *B60Q 9/00* | (2006.01) |
| *E01F 9/615* | (2016.01) |
| *E01F 9/658* | (2016.01) |

(52) U.S. Cl.
CPC ............ *B60Q 9/008* (2013.01); *E01F 9/617* (2016.02); *E01F 9/658* (2016.02)

(58) Field of Classification Search
CPC .. A61M 2205/3569; A61M 2205/3592; A61M 2205/6018; A61M 5/14248; A61N 1/08; A61N 1/37211; G08G 1/08; G08G 1/095
See application file for complete search history.

(56) References Cited

U.S. PATENT DOCUMENTS

| | | | | |
|---|---|---|---|---|
| 3,268,863 | A * | 8/1966 | Odion | G01S 13/92 340/933 |
| 5,032,963 | A * | 7/1991 | Granstrom | F21V 5/04 359/599 |
| 8,149,138 | B1 * | 4/2012 | Burke | E01F 13/06 340/908 |
| 8,154,424 | B2 * | 4/2012 | Selevan | G08G 1/07 116/18 |
| 8,362,923 | B2 * | 1/2013 | Witte | G08G 1/07 340/908 |
| 8,456,325 | B1 * | 6/2013 | Sikora | E21B 43/2401 340/909 |
| 2006/0197683 | A1 * | 9/2006 | Hammett | G08G 1/08 340/908 |

(Continued)

*Primary Examiner* — Steven Lim
*Assistant Examiner* — Muhammad Adnan
(74) *Attorney, Agent, or Firm* — Mu P.C.

(57) ABSTRACT

A traffic indicator warning unit for preventing collisions in blind corners has a weather-resistant chassis, a rechargeable battery within the chassis configured to power the unit, an indicator assembly mounted to the chassis comprising a first indicator light configured to indicate to a driver to stop and wait, and a second indicator light configured to indicate to a driver that the unit is non-operational, and further a motion-detector mounted to the chassis, configured to detect a moving vehicle near the unit, a metal detector mounted to the chassis, configured to detect the metal in a vehicle near the unit, and a transmitter/receiver within the chassis having an antenna, wherein the transmitter/receiver is configured to communicate with one or more other traffic warning units. A method of use of a traffic indicator warning system for a blind corner system is also disclosed.

14 Claims, 6 Drawing Sheets

(56) References Cited

U.S. PATENT DOCUMENTS

| | | | |
|---|---|---|---|
| 2008/0198038 A1* | 8/2008 | Yingst | G08G 1/0955 340/908 |
| 2009/0069868 A1* | 3/2009 | Bengtsson | A61M 5/14248 607/60 |
| 2009/0322563 A1* | 12/2009 | Stadtmiller | G08G 1/081 340/909 |
| 2014/0118553 A1* | 5/2014 | Diba | G08G 1/087 348/149 |
| 2015/0235037 A1* | 8/2015 | Schentrup | G06F 21/62 726/28 |

* cited by examiner

| | |
|---|---|
| 31 | Unit detects a vehicle using motion sensor and magnetic sensor |
| 32 | Unit signals to other units that vehicle is entering blind corner system |
| 33 | Other sensors provide signals to prevent traffic from entering blind corner system |
| 34 | When first vehicle departs blind corner system, the first vehicle is detected by the second unit's motion sensor and magnetic sensor |
| 35 | Second unit signals to vehicle to enter blind corner system |
| 36 | Once second vehicle leaves system, third vehicle is signaled to enter system by third unit, and so on |

Fig. 6

TRAFFIC WARNING INDICATOR SYSTEM

BACKGROUND OF THE INVENTION

1. Field of Invention

The present invention relates to the prevention of automobile collisions, particularly on single-lane roadways having blind corners.

2. Description of Related Art

Obstructed views are a major contributor to automobile collisions each year, resulting in injury and/or death. There have been some attempts in the art to prevent accidents using sensors and warning systems.

The prior art consists of various systems configured to prevent automobile collisions at intersections. For example, U.S. Pat. No. 7,190,283 to Varian discloses an intersection safety light assembly and method for warning a driver of a vehicle on a first road of an approaching vehicle on a second road that is approaching an intersection of the first and second roads. Similarly, U.S. Pat. No. 5,448,219 to Yoshikawa et al. discloses an indicating apparatus for preventing vehicles from colliding with each other as they pass an intersection of roads. Finally, U.S. Pat. No. 6,005,491 to Kopchak discloses a motion detecting traffic light system for use at a blind corner adjacent to which a first roadway and a second roadway intersect.

While there are a number of technologies in the art that assist in the prevention of automobile collisions at intersections, nothing addresses the danger posed by single-lane roads having blind corners. Based on the foregoing, there is a need in the art for a system that alerts a driver of oncoming traffic, and deters the driver from attempting passage of an upcoming single-lane roadway having a blind corner until passage can be safely made.

SUMMARY OF THE INVENTION

A traffic indicator warning unit for preventing collisions in blind corners has a weather-resistant chassis, a rechargeable battery within the chassis configured to power the unit, an indicator assembly mounted to the chassis comprising a first indicator light configured to indicate to a driver to stop and wait, and a second indicator light configured to indicate to a driver that the unit is non-operational, and further a motion-detector mounted to the chassis, configured to detect a moving vehicle near the unit, a metal detector mounted to the chassis, configured to detect the metal in a vehicle near the unit, and a transmitter/receiver within the chassis having an antenna, wherein the transmitter/receiver is configured to communicate with one or more other traffic warning units.

In an embodiment, the metal detector has an inductive coil or an ultrasonic transducer. A solar panel configured to recharge the battery may be present.

The second indicator illuminates when the unit cannot pair with another unit, indicating a malfunction.

A system of warning indicators is described having two or more of the units of claim 1, wherein the units have the same UID and are paired to one another, and wherein communications are shared between the units.

A method of use of a traffic indicator warning system for a blind corner system has the steps of i) a first vehicle is detected first by a motion sensor and then by a magnetic sensor of a first unit, ii) the first unit communicates to a second unit that the first vehicle is entering the blind corner system, iii) the second unit provides signals to prevent traffic nearby from entering the blind corner system, iv) as the first vehicle departs the blind corner system, the first vehicle is detected by a second unit's magnetic sensor, and v) the second unit signals to the second vehicle to enter the blind corner system, wherein while the second unit is in the system, all other signals indicate that traffic may not enter the blind corner system.

In an embodiment, once the second vehicle leaves the system, a third vehicle is signaled to enter system by a third unit, wherein the third unit detects the second vehicle by metal detection. In an embodiment, the first unit and second unit communicate wirelessly and share a common UID.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION

Preferred embodiments of the present invention and their advantages may be understood by referring to FIGS. 1-6 wherein like reference numerals refer to like elements.

Figure 1:
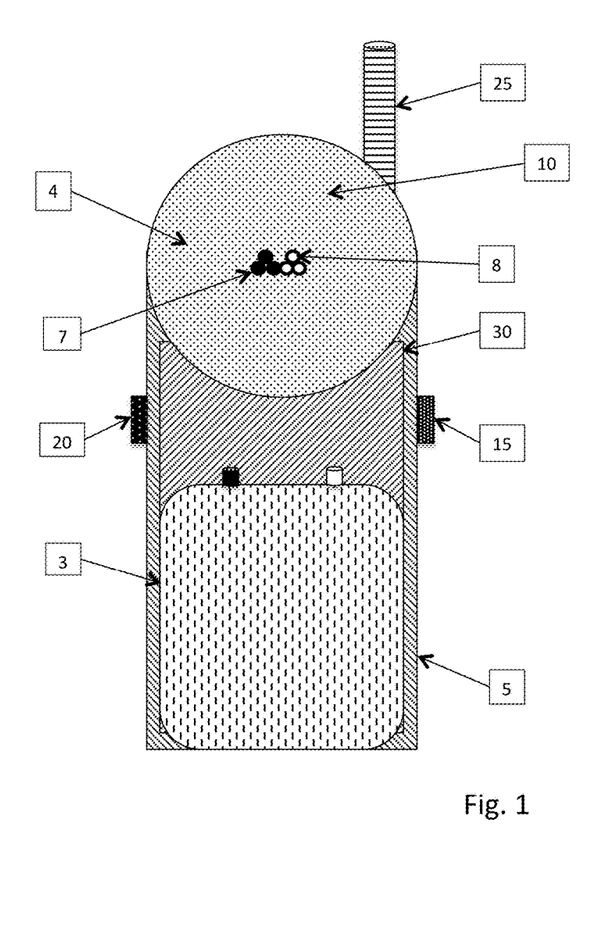
FIG. 1 is a cutaway view of the traffic warning indicator system, according to an embodiment of the present invention.
Figure 2:
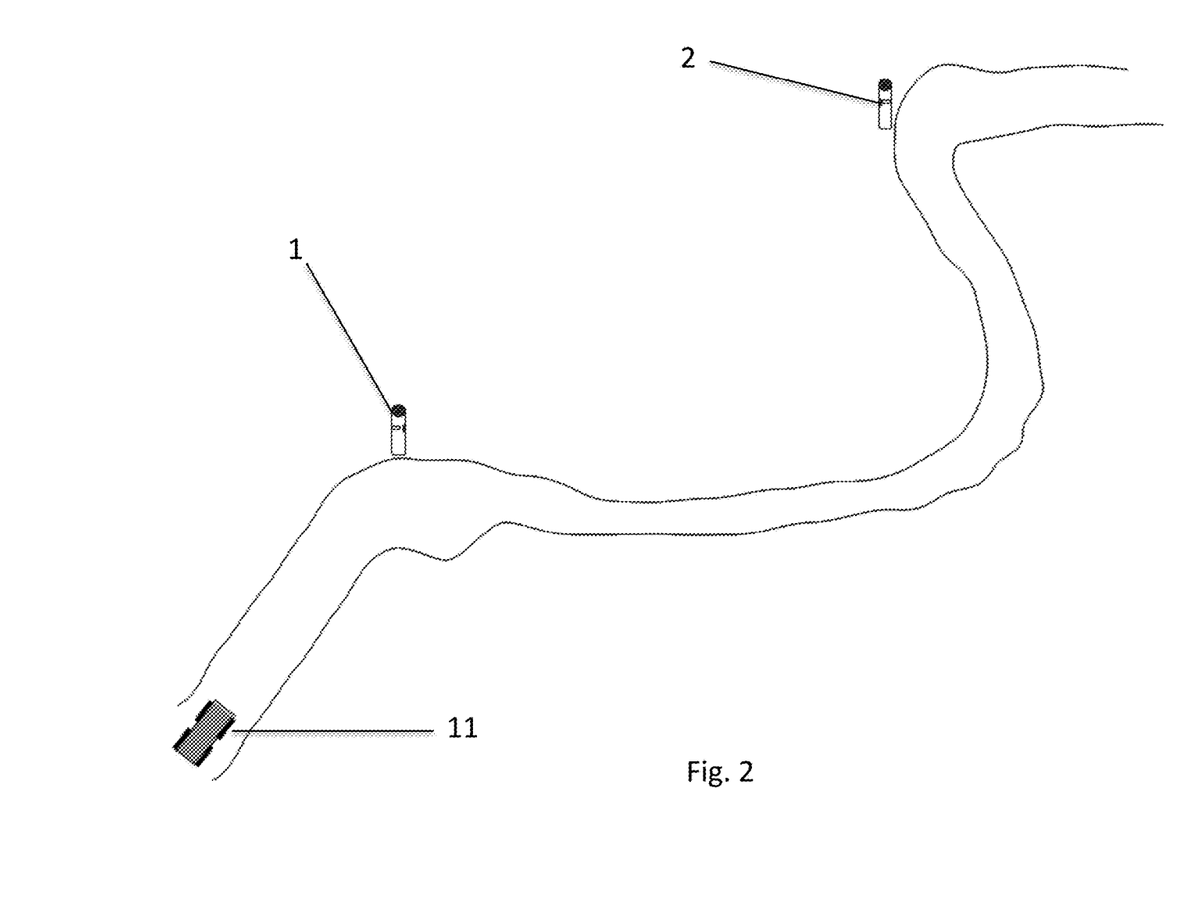
FIG. 2 is a view of the indicator system positioned at either end of a blind corner, according to an embodiment of the present invention.

With reference to FIG. 1, in a preferred embodiment, the present invention has at least two traffic warning indicator units. Each unit has a weather-sealed chassis 5 constructed of a rigid material such as die-cast aluminum or molded plastic. However, it would be understood and appreciated by one reasonably skilled in the art that that the chassis could be constructed of other alternative materials, such as a hybrid polymer, fiberglass or various other metals or plastics, without deviating from the scope of the invention. In an embodiment, the chassis contains a rechargeable battery 3 to power the system.

Connected to the exterior of the chassis 5 is an indicator assembly 4 that has a concave, reflective surface containing two high-intensity lights 7, 8, such that the reflective surface may channel light from the light arrays to the road. The lights 7, 8 may consist of LED, halogen, sodium or other high-intensity illumination technology and are preferably light arrays to avoid loss of signal from a burned-out bulb. The lights 7, 8 may be combined within a single light such as a multi-color type capable of showing red, green and yellow. In units configured to be used in systems of three or more units, there may also be a green light (not shown)

within the indicator assembly 4. The first array 7 is red to indicate to a driver to stop and pull over, in order to let the other driver pass, while the second array 8 is yellow to indicate to a driver to proceed with caution. One reasonably skilled in the art would understand and appreciate that alternative indicator lights or signals could be used without deviating from the scope of the present invention.

Also connected to the exterior of the chassis 5 is a motion detector 15 responsible for sensing a moving vehicle approaching the unit, and a metal detector 20 responsible for sensing a moving vehicle passing alongside the unit, in order to verify the signal of the motion detector 15 and prevent false positive signals from the motion detector, from an animal or other non-vehicle; and transmitter/receiver having an antenna 25 capable of transmitting and receiving data for communicating with a partner unit 2 through radio-frequency transmission, such as Wi-Fi or mobile phone frequency spectra or other wireless technologies known in the art. Preferably, the warning indicator system would operate in the family radio service or multi-use radio service, such that no licenses are required for deployment. Depending on the antenna 25 used, the antenna may be internal to the unit.

In an embodiment, the metal detector 20 is implemented with an inductive coil. In an alternative embodiment, the metal detector is implemented with an ultrasonic transducer. In either case the metal detector is able to detect a vehicle across the road from where the unit is positioned.

In a preferred embodiment, the present invention is powered by a battery unit 3, which allows the system to be easily implemented and used in remote areas without ready access to electricity. However, one reasonably skilled in the art would understand and appreciate that the present invention could be alternatively powered, for example by connecting to AC electricity, without deviating from the scope of the invention. In order to avoid a loss of power, a solar cell may be used to top up the battery during the day to keep it fully charged.

Housed within the chassis is a printed circuit board (PCB) 30 on which the electrical control circuits exist. Example embodiments of the PCB 30 include, but are not limited to, a firmware programmed micro-controller or a field programmable gate array (FPGA) with a processor core using programmed firmware. The PCB 30 is responsible for managing the system and monitoring the motion and metal detectors 15, 20; controlling the charging of the battery unit 3; instructing the signals to turn on and off the high-intensity indicating LEDs 7, 8; and controlling transmission and reception of the radio signals to and from a second unit 2 through the antennae 25 of the respective units. The FPGA on the PCB 30 may be substituted by an ASIC to bring down manufacturing costs on large numbers of units. The wireless transmitter/receiver (not shown) may be part of the PCB 30.

In a preferred embodiment, at least one solar panel 35 is movably mounted by brackets 40, or other fastening connectors known in the art, to the exterior of the chassis 5. The at least one solar panel 35 is connected to a battery charging control circuit on the PCB 30, and is responsible for harvesting solar energy to be used in recharging the battery unit.

With reference to FIGS. 1-5, in the absence of traffic flow, the first and second units 1, 2 remain in a sleep mode to conserve energy. In sleep mode, the units poll the motion detector 15 and wakes up on a positive signal. As a first vehicle 11 approaches unit 1, the unit's motion detector 15 detects the vehicle and wakes, or activates, the PCB 30 and prepares for operation. As the vehicle 11 passes by the unit 1, the unit's metal detector 20 is activated and confirms that the approaching object is in fact a metal-containing vehicle, versus any other non-metal moving object, such as an animal. The metal detector 20 may use induction to determine the presence of a large metal object, even if the vehicle is moving quickly. This prevents the first unit 1 from sending a false positive signal to a second unit 2.

Figure 3:
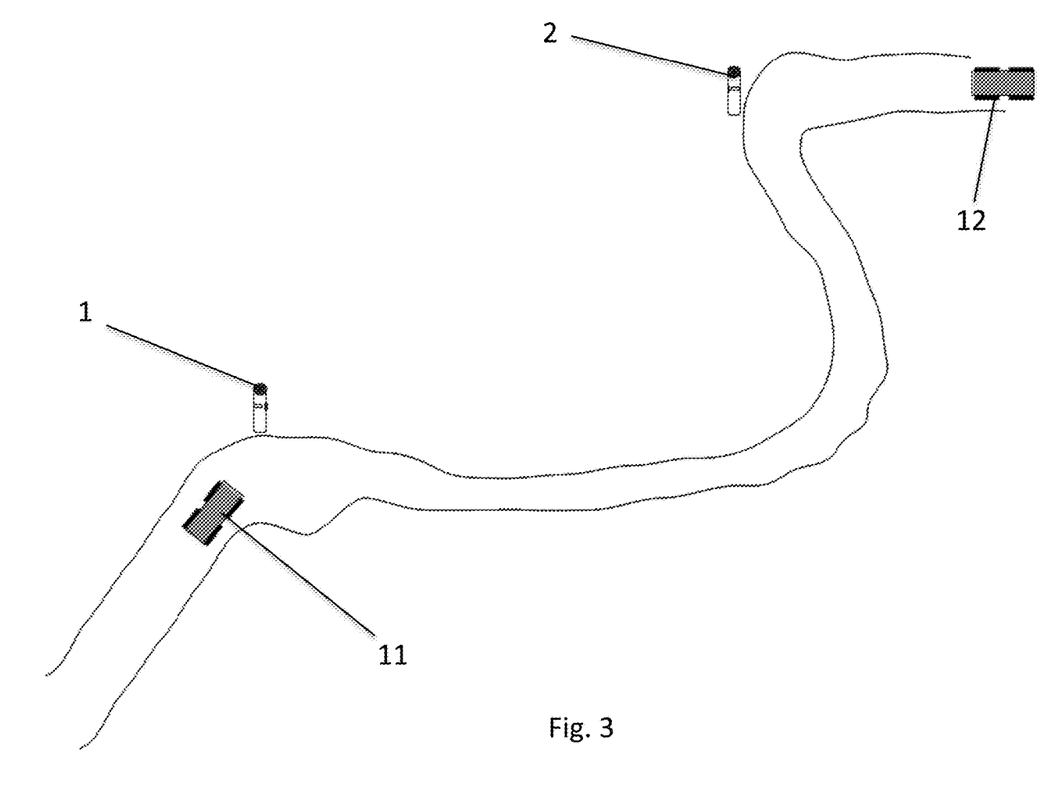
FIG. 3 is a view of the indicator system positioned around a blind corner with cars entering at either end, according to an embodiment of the present invention.
Figure 4:
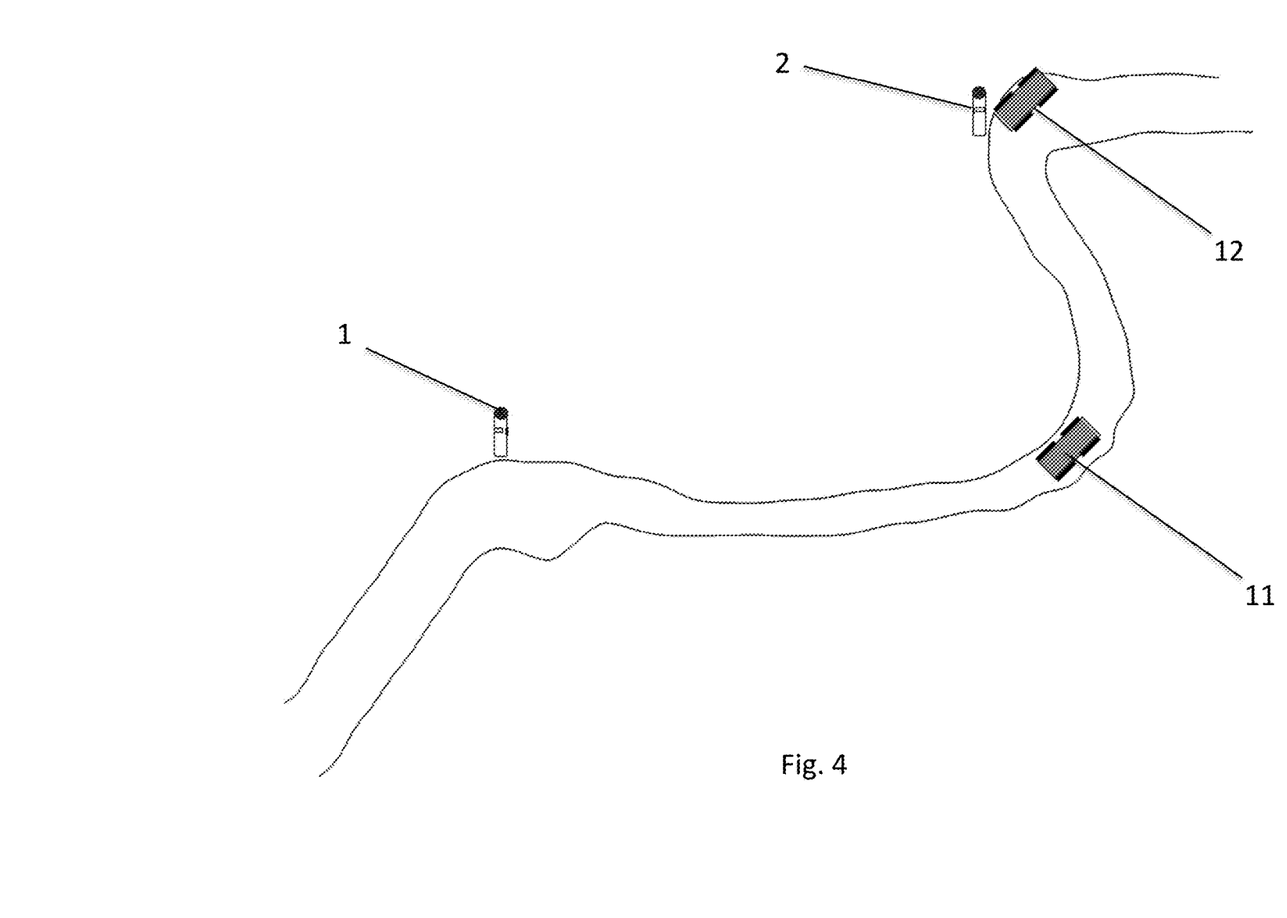
FIG. 4 is a view of the indicator system positioned around a blind corner, with one car proceeding and a second car waiting, according to an embodiment of the present invention.

With reference to FIG. 3 in particular, upon confirmation by the metal detector 20 that the object is large and made of metal, a signal is generated by the PCB 30 and is transmitted wirelessly through the antenna 25 to the second unit 2. Upon receipt of the signal, second unit 2 initiates the flashing of the array of red LED warning indicator lights 7. As noted above, the red lights 7 indicate to a second vehicle travelling toward second unit 2 in a direction toward the first vehicle, to stop and await passage of oncoming traffic.

Figure 5:
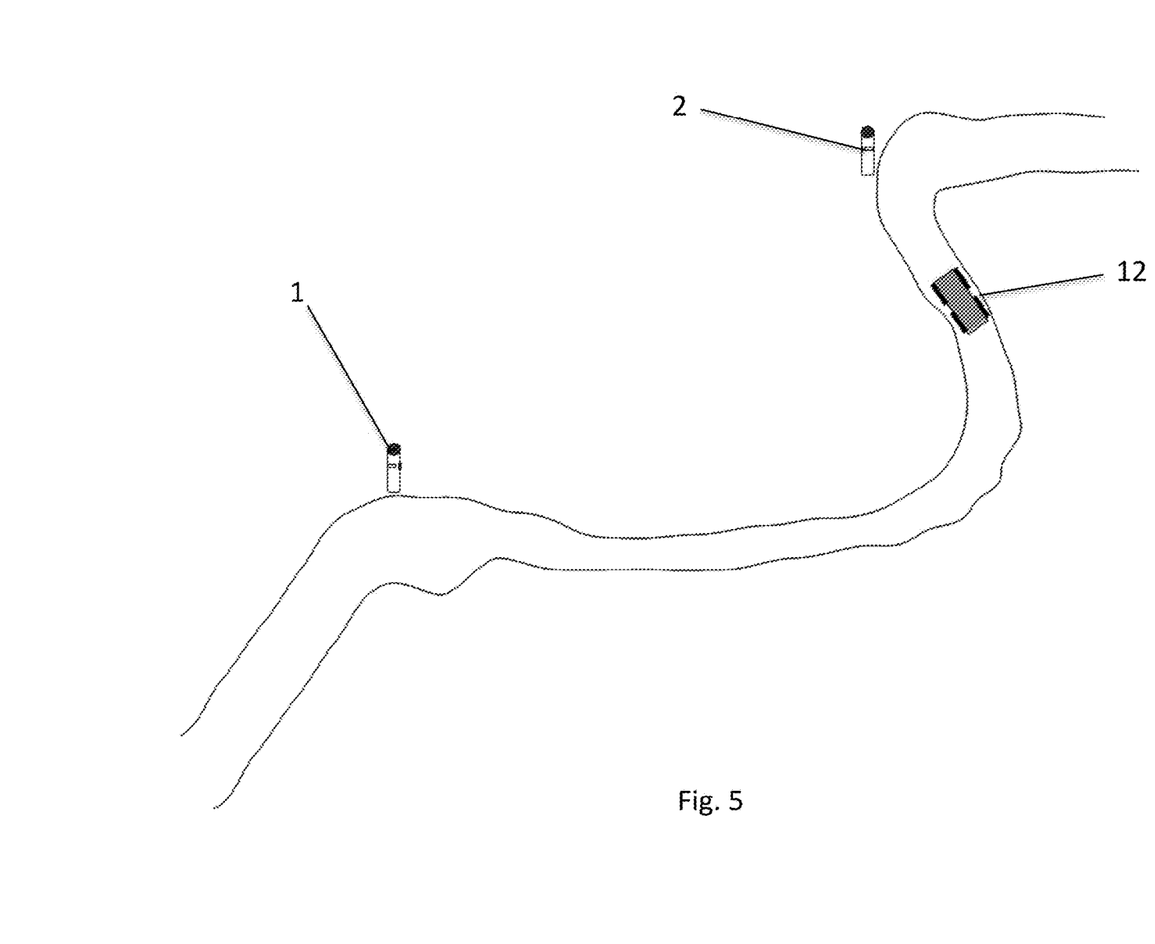
FIG. 5 is a view of the indicator system positioned at either end of a blind corner, with a second car proceeding, according to an embodiment of the present invention.

As the first vehicle reaches second unit 2, and is detected by the second unit's metal detector 20, the flashing of the red LED lights 7 ceases and the system is reset. As the second vehicle 12 moves forward past the second unit 2 and is detected by the unit's metal detector 20, a signal is generated by the partner unit's PCB 30 and is transmitted wirelessly through the antenna 25 to unit 1. As shown in FIG. 5, upon receipt of the signal, the PCB 30 of unit 1 initiates the flashing of the array of red LED warning indicator lights 7 in the similar manner to that described above. The yellow indicator lights flash or illuminate when the system is unsure about the status of the blind corner, and in particular arises when there is failure of the electronics or the battery, or where the unit cannot successfully pair with the other, associated unit having the same UID.

This system will continue as described above, until all traffic has safely passed. After a pre-determined time has elapsed without traffic, the units will re-enter sleep mode until re-activated by the motion sensor 15 detecting a moving object. The system may also work with three or more units, located for example in mountains, canyons or other blind road areas. When a first unit detects a vehicle, it sends a signal to all other units to flash the red stop light, to prevent new traffic from entering the "blind road" system. Once the first car has exited, as evidenced by one of the other units detecting a vehicle (since the next car has not passed the metal detector yet) the next car is chosen at random or according to a pre-selected algorithm, such as a priority encoding scheme: "first come", or "round robin". While a vehicle is within the blind corner system, no other vehicle is permitted to enter, until the vehicle leaves the blind road. The next car is signaled by either the absence of a red flashing, or an indicator of another sort such as a green light to indicate traffic should move. In an embodiment, a plurality of vehicles may pass through when the indicator shows that traffic may pass, much as a stoplight does in highway traffic. In systems of three or more units, a green light may be used to indicate to a waiting car that it is to proceed into the blind corner system.

In an embodiment, the units communicate with other units sharing their UID, but may have individual identification numbers so a microcontroller can control traffic having a basic understanding of the blind corner and the position of the other unit(s). The microcontroller may reside within a single unit, and may receive and transmit signals to all other units sharing the UID. The microcontroller permits a unit to signal to multiple vehicles to enter into the blind system. The microcontroller may keep track of the number of vehicles (using the metal detector) having entered the system and only signal for further vehicles to enter the system when all counted vehicles have exited.

Figure 6:
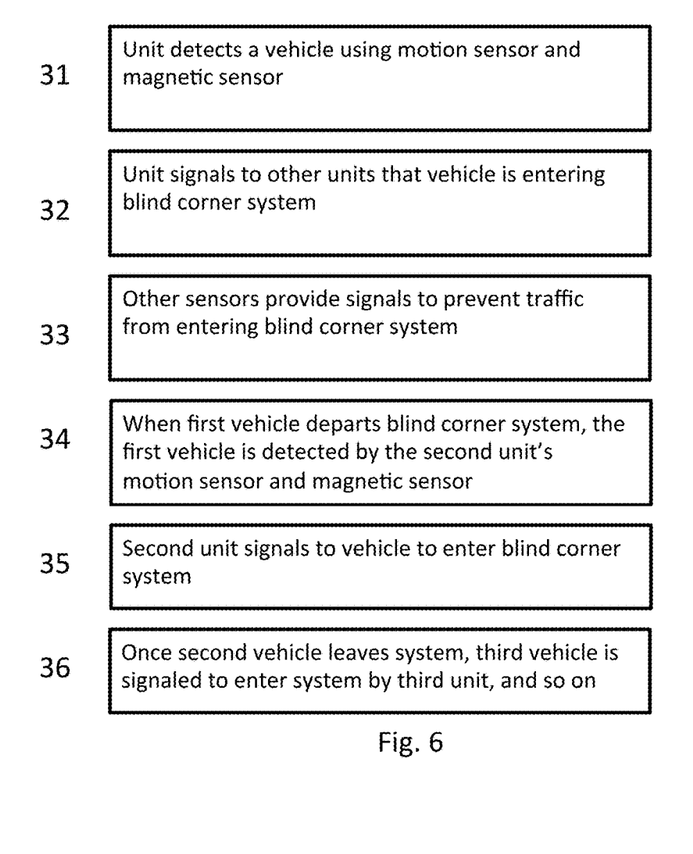
FIG. 6 is a flowchart of a method of use of the system, according to an embodiment of the present invention.

With reference to FIG. 6, the method described above is summarized. In step 31, a first vehicle is detected using motion sensor and magnetic sensor. In step 32, the first unit signals to other units that the first vehicle is entering blind corner system. In step 33, other sensors provide signals to prevent traffic near them from entering blind corner system. In step 34, when the first vehicle departs blind corner system, the first vehicle is detected by another unit's, in this case the second unit's magnetic sensor. In step 35 the second unit signals to the second vehicle to enter blind corner system. In step 36, once second vehicle leaves system, third vehicle is signaled to enter system by third unit, and so on. While the second unit is in the system, all other signals indicate that traffic may not enter the blind corner system. With three or more units, 1) all the units in a road section would have to be aware of each other as a result of sufficient radio signal strength and a common UID; and 2) all the units would have to be configured as a set.

In an embodiment, when a unit 1, 2 receives power to its PCB 30, it accesses firmware from its internal flash storage and initializes its micro-controller and external circuits. It then attempts to pair with a partner unit 1, 2 having a matching unit identifier (UID). In order to operate, units 1, 2 must have identical UID's, so that they will pair properly with one another, and the units 1, 2 must face each other from opposite ends of a road section so the metal detectors are facing towards the inside of the roadway. Once in sleep mode, the units 1, 2 will periodically wake up, or activate, to ensure that they can still pair with their partner unit. If a unit 1, 2 fails to successfully pair with its partner unit, then that unit 1, 2 will slowly flash its yellow caution/error LEDs to indicate a pairing or low battery issue. In a system using three or more units, units pair with other units that have the same UID. Groups of units having the same UID may be installed in a blind road system, and are identified by each other as being from the same system by the UID. Other, nearby systems may have other UIDs to eliminate the possibility that a signal from a unit in one system sets off a red light 7 in a unit in another system. UIDs are unique numbers that may be based on the unit's serial number and are stored in a microcontroller's non-volatile memory space. The microcontroller may be pre-programmed at the factory, and the manufacturer may be able to keep track of the location of the units to provide identical replacements if needed.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A traffic indicator warning unit for preventing collisions in blind corners, the unit comprising:
    a. a weather-resistant chassis;
    b. a rechargeable battery within the chassis configured to power the unit;
    c. a motion-detector mounted to the chassis, configured to detect a moving vehicle near the unit;
    d. a metal detector mounted to the chassis, configured to detect the metal in a vehicle near the unit;
    e. a transmitter/receiver within the chassis having an antenna, wherein the transmitter/receiver is configured to communicate with one or more other traffic warning units; and
    f. an indicator assembly mounted to the chassis comprising:
        i. a first indicator light configured to indicate to a driver to stop and wait based on a signal received from the one or more other traffic warning units;
        ii. a second indicator light configured to indicate to a driver that the unit is non-operational when the unit is not able to communicate with the one or more other traffic warning units;
        iii. one or more concave and reflective surfaces;
        iv. wherein the one or more concave and reflective surfaces are configured to channel light from the first indicator light or the second indicator light to the driver: wherein the first indicator light comprises a plurality of monocolored lights or a plurality of multi-colored lights: and wherein the second indicator light comprises a plurality of mono-colored lights or a plurality of multi-colored lights.

2. The warning unit of claim 1, wherein the metal detector has an inductive coil.

3. The warning unit of claim 1, wherein the metal detector has an ultrasonic transducer.

4. The warning unit of claim 1, further comprising a solar panel configured to recharge the battery, wherein the solar panel is moveably mounted to the warning unit.

5. The warning unit of claim 1, wherein the second indicator illuminates when the unit cannot pair with another unit.

6. A system of warning indicators, comprising two or more of the units of claim 1, wherein the units each have a same unit identifier and are paired to one another, and wherein data is communicated between the units.

7. A method of use of a traffic indicator warning system for a blind corner system has the steps of:
    a. a first vehicle is detected by a motion sensor and magnetic sensor of a first unit;
    b. the first unit communicates to a second unit that the first vehicle is entering the blind corner system;
    c. the second unit provides signals to prevent traffic nearby from entering the blind corner system using a first indicator light based on the communication received from the first unit, wherein a second indicator light configured to indicate that the second unit is non-operational when the unit is not able to communicate with the first unit;
    d. as the first vehicle departs the blind corner system, the first vehicle is detected by a second unit's magnetic sensor; and
    e. the second unit signals using the first indicator light to a second vehicle to enter the blind corner system; wherein while the first vehicle is in the system, all other signals indicate that traffic may not enter the blind corner system.

8. The method of claim 7, wherein once the second vehicle leaves the system, a third vehicle is signaled to enter the system by a third unit, wherein the third unit detects the second vehicle by metal detection.

9. The method of claim 7, wherein the first unit and second unit communicate wirelessly and share a common unit identifier.

10. The method of claim 7, further comprising the step of entering a sleep mode comprising:
    a. the first unit and the second unit autonomously powering down to conserve energy if a predetermined amount of time has elapsed without the first vehicle being detected;

b. the first unit and the second unit autonomously powering up from the sleep mode after a predetermined amount of time has elapsed since entering the sleep mode; and c. the first unit testing for connectivity with the second unit.

11. A system for preventing collisions in blind corners comprising:
   a. a plurality of indicator warning units, wherein at least one of the plurality of indicator warning units comprises
      i. a weather-resistant chassis;
      ii. a rechargeable battery within the chassis configured to power the at least one of the plurality of indicator warning units;
      iii. a motion-detector mounted to the chassis, configured to detect moving vehicles;
      iv. a metal detector mounted to the chassis, configured to detect moving vehicles;
      v. a transmitter/receiver within the chassis having an antenna, wherein the transmitter/receiver is configured to communicate with one or more of the plurality of indicator warning units;
      vi. an indicator assembly mounted to the chassis, the indicator comprising:
         1. a first indicator light configured to indicate to a driver to stop and wait based on a signal received from the one or more other traffic warning units;
         2. a second indicator light configured to indicate to a driver that the unit is non-operational when the unit is not able to communicate with the one or more other traffic warning units; and
         3. one or more concave and reflective surfaces;
         4. wherein the one or more concave and reflective surfaces are configured to channel light from the first indicator light or the second indicator light to the driver; wherein the first indicator light comprises a plurality of mono-colored lights or a plurality of multicolored lights; and wherein the second indicator light comprises a plurality of mono-colored lights or a plurality of multi-colored lights;
   b. detecting a first vehicle entering the system;
   c. sending a notification that the first vehicle has been detected;
   d. providing traffic signals that the first vehicle has been detected;
   e. detecting the first vehicle exiting the system; and
   f. providing traffic signals that the first vehicle has exited the system.

12. The system of claim 11, wherein the step of detecting a first vehicle is selected from the list consisting of:
   a. the motion-detector detecting the first vehicle; and
   b. the metal detector detecting the first vehicle.

13. The system of claim 11, further comprising the step of the plurality of
   indicator warning units activating the second indicator light to alert drivers that at least one of the plurality of indicator warning units is malfunctioning.

14. The system of claim 11, further comprising the step of entering a sleep mode, wherein the sleep mode comprises the steps of:
   a. at least one of the plurality of indicator warning units reducing power consumption;
   b. at least one of the plurality of indicator warning units waking after a predetermined length of time; and
   c. at least one of the plurality of indicator warning units sending a signal to other indicator warning units to check for connectivity.

* * * * *